US010573863B2

(12) United States Patent
Sweazey et al.

(10) Patent No.: US 10,573,863 B2
(45) Date of Patent: Feb. 25, 2020

(54) BATTERY AND AUXILIARY POWER UNIT MOUNTING SYSTEM

(71) Applicant: Phillips & Temro Industries Inc., Eden Prairie, MN (US)

(72) Inventors: John D. Sweazey, Eden Prairie, MN (US); Mark A. Fancher, Excelsior, MN (US); Robert H. Jordan, West Bend, WI (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 355 days.

(21) Appl. No.: 15/401,361

(22) Filed: Jan. 9, 2017

(65) Prior Publication Data
US 2017/0244078 A1 Aug. 24, 2017

Related U.S. Application Data

(60) Provisional application No. 62/299,252, filed on Feb. 24, 2016.

(51) Int. Cl.
*H01M 2/10* (2006.01)
*B60R 16/04* (2006.01)
*H01M 16/00* (2006.01)

(52) U.S. Cl.
CPC .......... *H01M 2/1083* (2013.01); *B60R 16/04* (2013.01); *H01M 2/1077* (2013.01); *H01M 16/006* (2013.01); *H01M 2220/20* (2013.01)

(58) Field of Classification Search
CPC ............... B60K 2001/0405; B60K 2001/0438
See application file for complete search history.

(56) References Cited

U.S. PATENT DOCUMENTS

| 4,723,618 | A | | 2/1988 | Coonradt | |
|---|---|---|---|---|---|
| 5,333,678 | A | * | 8/1994 | Mellum | B60H 1/00378 122/26 |
| 5,501,292 | A | * | 3/1996 | Kawashima | B62K 25/283 180/220 |
| 7,049,707 | B2 | * | 5/2006 | Wurtele | B60H 1/00378 290/1 A |
| 7,245,033 | B2 | * | 7/2007 | Wurtele | B60H 1/00378 123/2 |
| 8,002,063 | B2 | * | 8/2011 | Rydberg | B60R 16/04 180/68.5 |
| 8,122,989 | B2 | | 2/2012 | Burchett et al. | |
| 9,045,018 | B2 | * | 6/2015 | Swanson | B60H 1/00378 |
| 9,283,837 | B1 | * | 3/2016 | Rawlinson | H02K 5/04 |
| 9,318,731 | B2 | * | 4/2016 | Lee | H01M 2/1083 |
| 9,616,766 | B2 | * | 4/2017 | Fujii | B60L 11/1879 |

(Continued)

FOREIGN PATENT DOCUMENTS

CA 2145610 A1 9/1996

*Primary Examiner* — James A Shriver, II
*Assistant Examiner* — Vaughn Coolman
(74) *Attorney, Agent, or Firm* — Harness, Dickey & Pierce, P.L.C.

(57) ABSTRACT

An assembly may include an auxiliary power unit housing, a battery box, and a pair of brackets. The battery box may include a base, a first cover and a second cover. The first cover may be removably attached to the base. The auxiliary power unit housing may be mounted to the second cover. The first cover may include a lip that engages a flange of the second cover. The brackets may extend laterally outward from lateral sides of the base.

19 Claims, 10 Drawing Sheets

(56) References Cited

U.S. PATENT DOCUMENTS

| | | | |
|---|---|---|---|
| 9,627,721 B2* | 4/2017 | Kosaki | H02J 7/0068 |
| 9,694,651 B2* | 7/2017 | Zeigler | B60H 1/00378 |
| 9,899,647 B2* | 2/2018 | Murai | H01M 2/1077 |
| 2002/0030363 A1* | 3/2002 | Kennedy | B60R 16/04 |
| | | | 290/1 A |
| 2002/0093246 A1* | 7/2002 | Takahashi | B60K 1/04 |
| | | | 307/9.1 |
| 2002/0162696 A1* | 11/2002 | Maus | B60K 1/04 |
| | | | 180/68.5 |
| 2004/0145185 A1* | 7/2004 | Kennedy | B60R 16/04 |
| | | | 290/1 R |
| 2006/0266759 A1* | 11/2006 | Tramontina | A47K 10/423 |
| | | | 221/33 |
| 2007/0221431 A1 | 9/2007 | Hirsh | |
| 2008/0023965 A1 | 1/2008 | Cagliari et al. | |
| 2009/0000843 A1* | 1/2009 | Burchett | B60R 16/04 |
| | | | 180/68.5 |
| 2010/0307848 A1* | 12/2010 | Hashimoto | B60K 1/04 |
| | | | 180/68.5 |
| 2011/0315464 A1* | 12/2011 | Yokoyama | B60K 1/04 |
| | | | 180/68.5 |
| 2012/0070716 A1* | 3/2012 | Yoshioka | B60K 1/04 |
| | | | 429/156 |
| 2012/0164500 A1* | 6/2012 | Loo | H01M 2/1072 |
| | | | 429/82 |
| 2012/0223113 A1* | 9/2012 | Gaisne | H01M 2/1083 |
| | | | 224/538 |
| 2012/0224326 A1* | 9/2012 | Kohlberger | H01M 2/1077 |
| | | | 361/699 |
| 2012/0241241 A1* | 9/2012 | Takamura | B62K 11/04 |
| | | | 180/335 |
| 2012/0282507 A1* | 11/2012 | Andre | B60K 1/04 |
| | | | 429/100 |
| 2012/0313559 A1* | 12/2012 | Tonomura | H01M 2/1077 |
| | | | 318/139 |
| 2013/0061621 A1* | 3/2013 | Nielsen | B60H 1/00257 |
| | | | 62/236 |
| 2013/0192913 A1* | 8/2013 | Joye | B60K 1/04 |
| | | | 180/68.5 |
| 2015/0345110 A1* | 12/2015 | Takeuchi | H01M 2/1083 |
| | | | 180/65.21 |
| 2016/0056431 A1* | 2/2016 | Subramanian | B60K 1/04 |
| | | | 429/149 |
| 2016/0093850 A1* | 3/2016 | DeKeuster | H01M 2/1077 |
| | | | 429/163 |
| 2017/0073155 A1* | 3/2017 | Borkgren | B65D 25/28 |
| 2017/0136864 A1* | 5/2017 | Ito | B60K 1/04 |
| 2017/0267089 A1* | 9/2017 | Sugizaki | B60K 1/04 |
| 2017/0313170 A1* | 11/2017 | Hara | B60K 1/04 |
| 2017/0334310 A1* | 11/2017 | Yokoyama | B60L 11/1877 |
| 2017/0341499 A1* | 11/2017 | Marchisseau | B60K 1/04 |

* cited by examiner

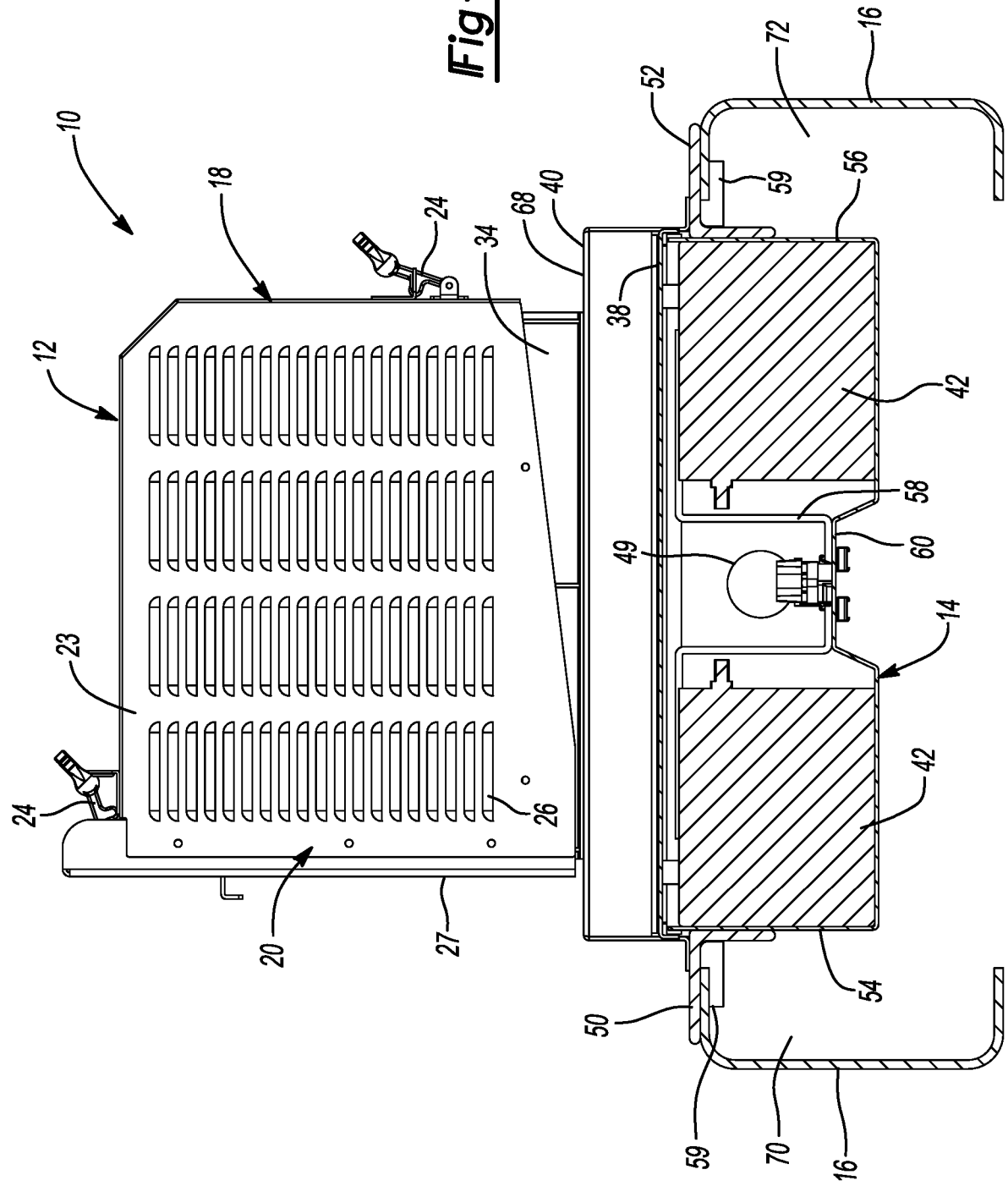

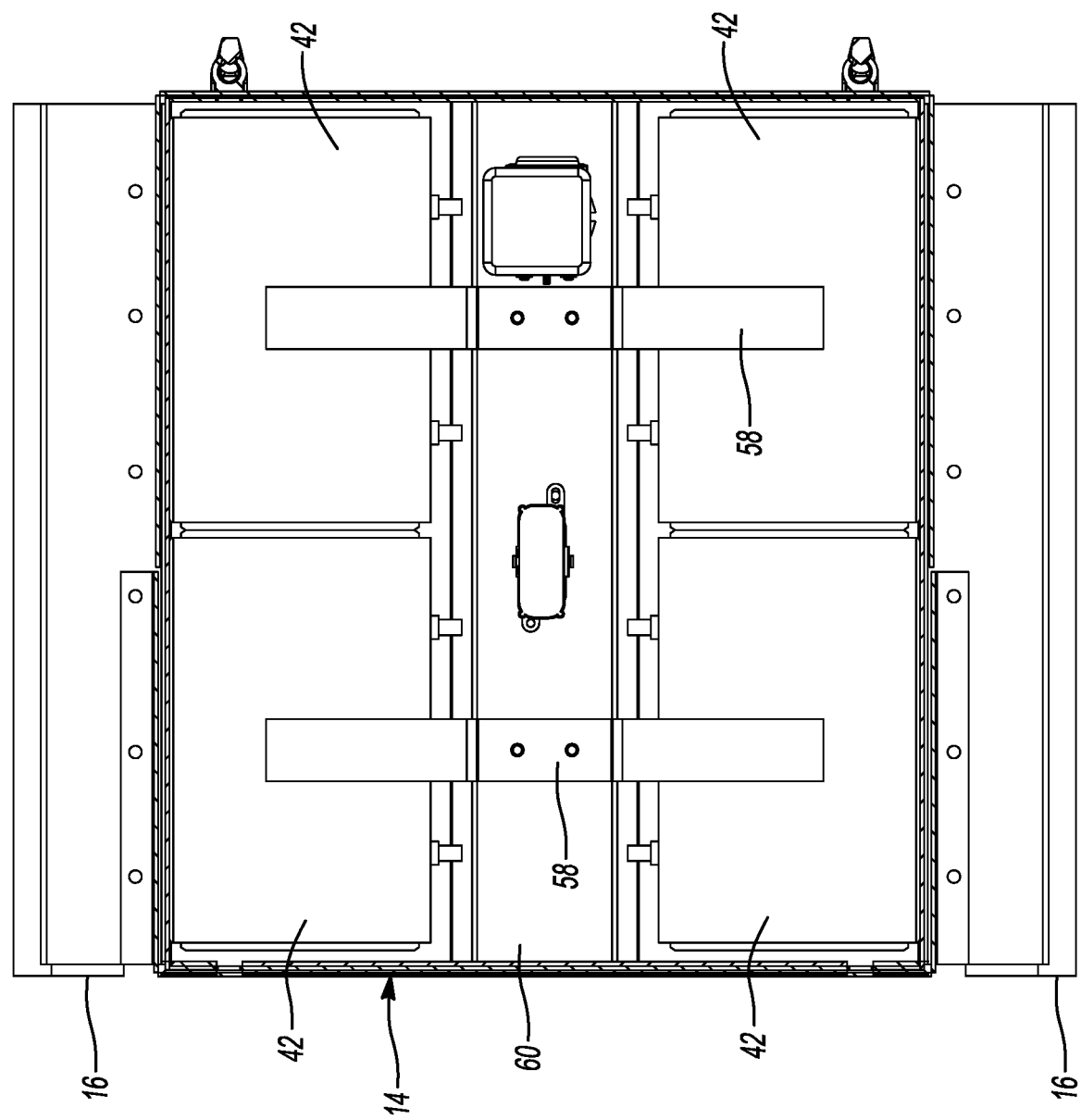

Alternative Exterior Mounting Locations
APU, HVAC, & Compact Frame Rail Placement

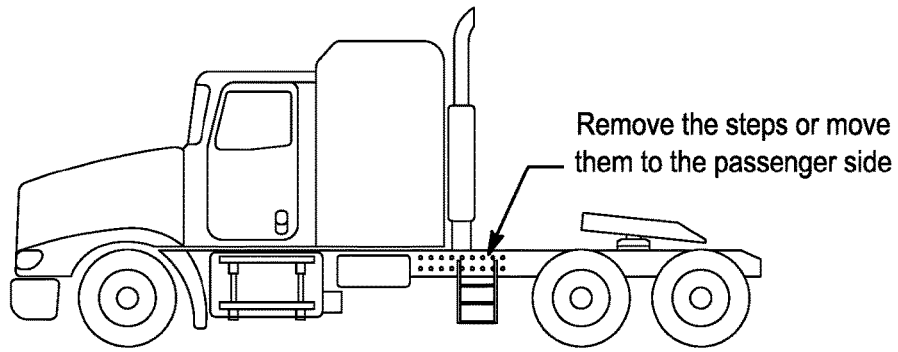

Remove the steps or move them to the passenger side

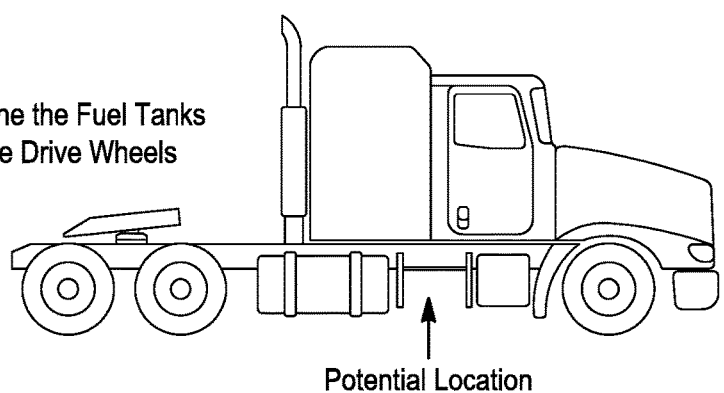

Some trucks may the the Fuel Tanks mounted near the Drive Wheels

Potential Location

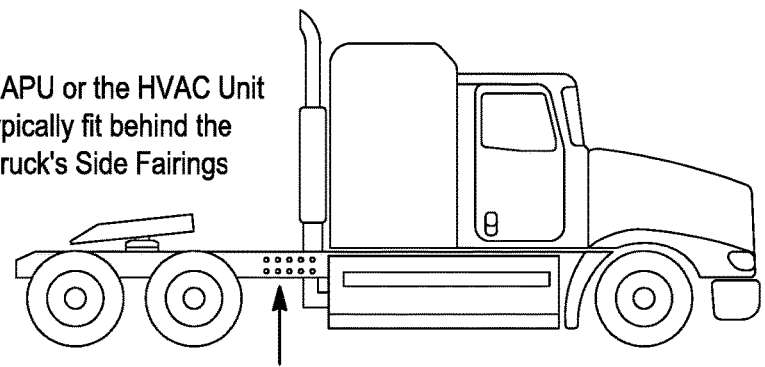

The APU or the HVAC Unit typically fit behind the Truck's Side Fairings

Truck with Side Fairings

Fig-11

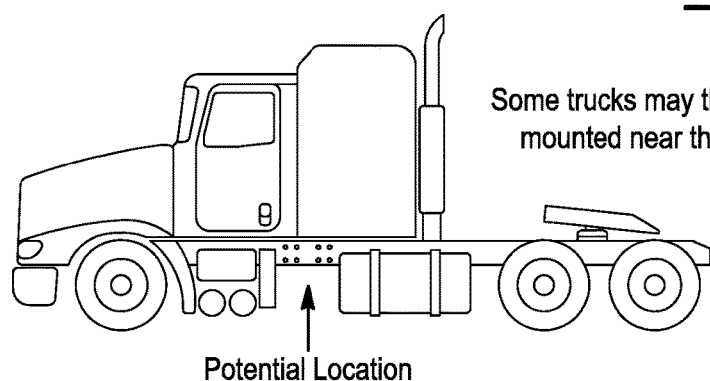

Some trucks may the the Fuel Tanks mounted near the Drive Wheels

Potential Location

BATTERY AND AUXILIARY POWER UNIT MOUNTING SYSTEM

CROSS-REFERENCE TO RELATED APPLICATIONS

This application claims the benefit of U.S. Provisional Application No. 62/299,252, filed on Feb. 24, 2016. The entire disclosure of the above application is incorporated herein by reference.

FIELD

The present disclosure relates to an auxiliary power unit and battery box, and more particularly to an over-frame-rail mounted auxiliary power unit and battery box.

SUMMARY

This section provides a general summary of the disclosure, and is not a comprehensive disclosure of its full scope or all of its features.

In one form, the present disclosure provides an assembly that may include an auxiliary power unit (APU) housing, a battery box, and a pair of brackets. The battery box may include a base, a first cover and a second cover. The first cover may be removably attached to the base. The APU housing may be mounted to the second cover. The first cover may include a lip that engages a flange of the second cover. The brackets may extend laterally outward from lateral sides of the base.

In some configurations, the APU housing is mounted to a planar surface of the second cover. The second cover may extend from the base further than the first cover extends from the base in a direction that is perpendicular to the planar surface such that the second cover is disposed between the APU housing and the first cover in the direction.

In some configurations, the APU housing includes a removable lid.

In some configurations, the assembly includes a plurality of latches removably securing the lid to the APU housing.

In some configurations, the second cover is fixedly attached to the base.

In some configurations, the assembly includes APU-support brackets coupling the APU housing to the second cover.

In some configurations, the APU-support brackets are disposed in recesses in the APU housing.

In some configurations, the APU housing includes a shroud at least partially surrounding one or more of the APU-support brackets.

In some configurations, the lip engages a flange at a first end of the second cover. The APU housing may be mounted to a second end of the second cover opposite the first end.

In some configurations, the assembly includes one or more batteries disposed within the base.

In some configurations, the assembly includes a plurality of battery brackets. Each of the battery brackets may couple two adjacent batteries to each other and may be attached to the base.

In some configurations, the battery brackets are attached to a ridge formed in the base. The ridge may extend between pairs of adjacent batteries.

In some configurations, the assembly includes a plurality of latches removably securing the first cover to the base.

In some configurations, the assembly includes a power supply disposed within the APU housing.

In some configurations, the brackets are attached to truck frame rails such that at least a portion of the battery box is suspended between the truck frame rails.

In some configurations, the first cover is disposed between the truck frame rails.

In some configurations, the assembly includes a plurality of clamps configured to secure the brackets to a pair of truck frame rails.

In some configurations, the brackets have substantially L-shaped profiles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a cross-sectional view of the battery box and auxiliary power unit assembly taken along line B-B of FIG. 5;

FIG. 8 is a cross-sectional view of the battery box and auxiliary power unit assembly taken along line C-C of FIG. 5;

FIG. 11 depicts exemplary locations on Class 8 trucks at which the battery box and auxiliary power unit assembly could be mounted.

Corresponding reference numerals indicate corresponding parts throughout the several views of the drawings.

DETAILED DESCRIPTION

Figure 1:
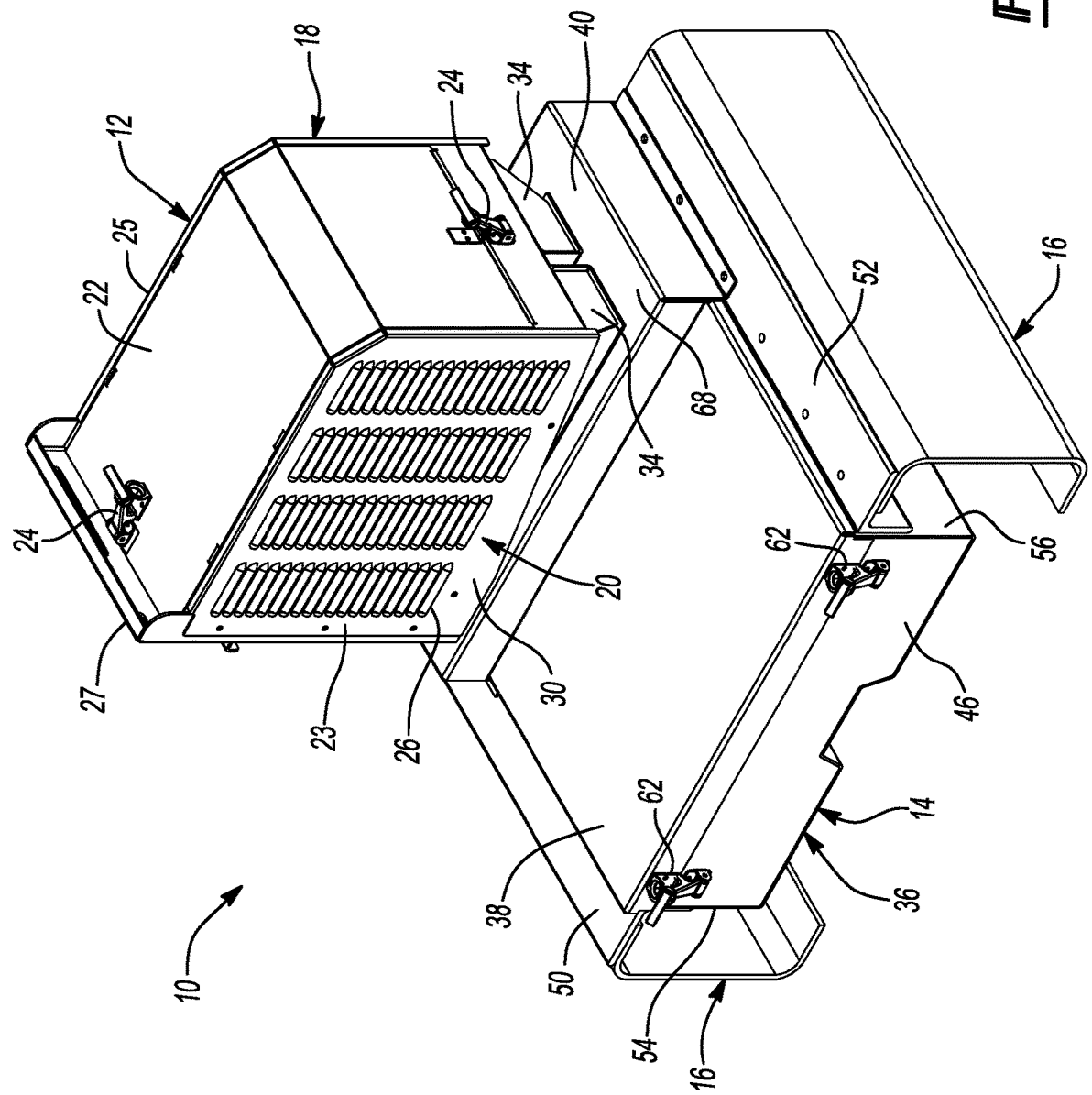
FIG. 1 is a perspective view of a battery box and auxiliary power unit assembly mounted to rails according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-11, an assembly 10 is provided that may include an auxiliary power unit (APU) 12 and a battery box 14. The assembly 10 may be mounted to a pair of rails 16 of a vehicle such as a commercial truck (e.g., Class 8 trucks, etc.), a locomotive, an aircraft or a marine vehicle, for example. The rails 16 may be truck frame rails.

The assembly 10 may provide electrical power to various electrical systems (e.g., electrical accessory systems) of the vehicle. The assembly 10 may be mounted to the rails 16 so that the battery box 14 can be over-rail-mounted on a chassis of a Class 8 truck, for example. The APU 12 may be mounted to the battery box 14 to allow the APU 12 to be contained in an area that does not interfere with other side-mounted equipment on the truck (e.g., fuel tanks, air tanks, hydraulic pumps, and exhaust systems. Further, mounting the APU 12 in such a manner reduces noise, vibration and harshness (NVH), reduces exposure to road spray (moisture, salt, dirt, debris, etc.), and eliminates driveline/driveshaft interference.

Figure 10:
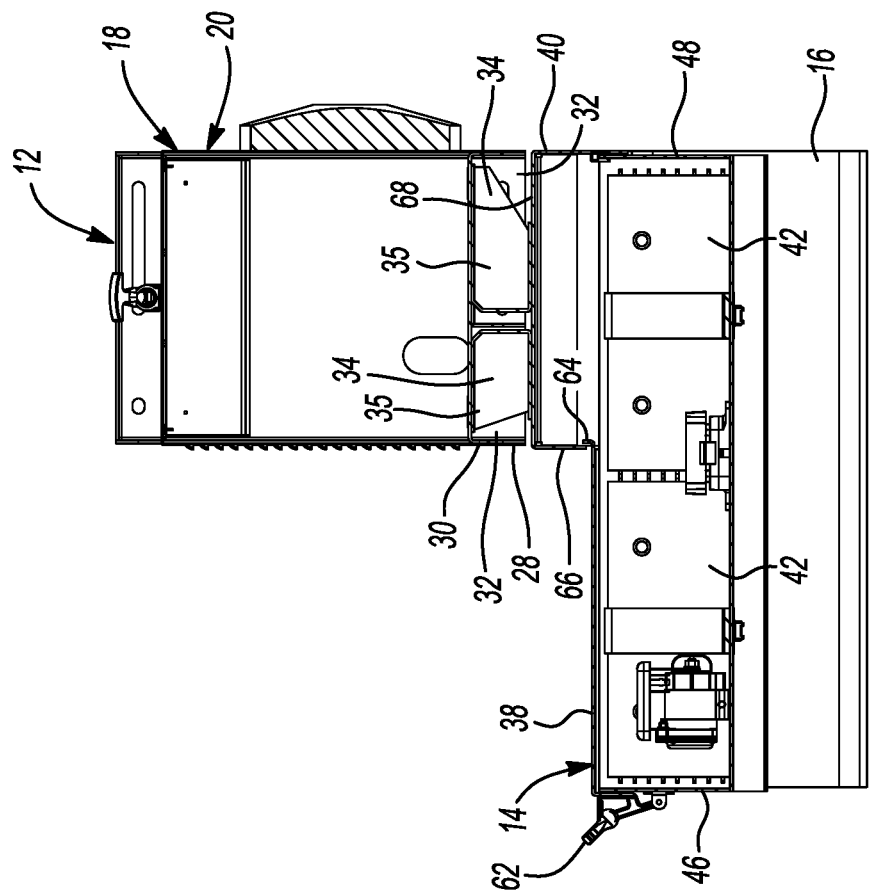
FIG. 10 is a cross-sectional view of the battery box and auxiliary power unit assembly taken along line D-D of FIG. 9.
Figure 9:
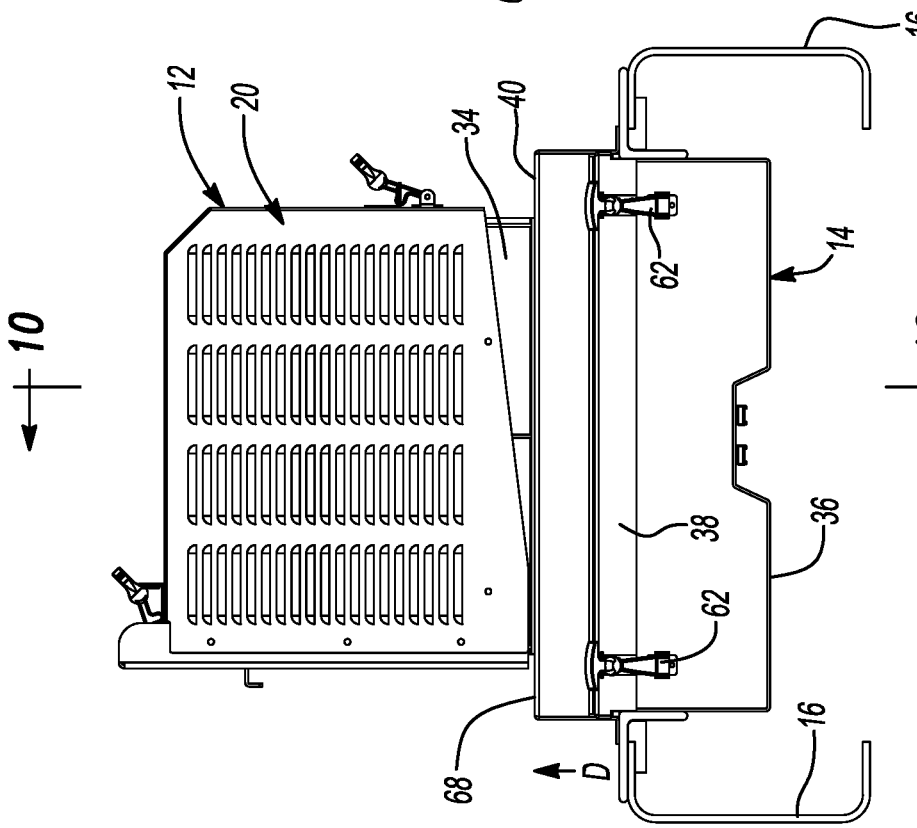
FIG. 9 is an end view of the battery box and auxiliary power unit assembly.

The APU 12 may include a housing 18 and a power supply (e.g., a combustion-engine-driven generator, one or more batteries, fuel cells, etc.) (not shown) disposed within the housing 18. The housing 18 may be formed from a metallic material, for example, and/or any other suitable material. The housing 18 may include a first base 20 and a removable lid 22. The lid 22 may be selectively secured to the first base 20 by a plurality of latches 24 (e.g., rubber latches) and/or any other suitable fasteners or closure devices (e.g., bolts or clamps). The first base 20 may include a first sidewall 23, a second sidewall 25, and an end wall 27. The first base 20 and/or the lid 22 may include a plurality of vent apertures 26 and/or heat-dissipation fins to allow heat from the power supply to be transferred to the ambient atmosphere. As shown in FIG. 10, an end 28 of the first base 20 may include a shroud 30 defining recesses 32. Support brackets 34 may be disposed within the recesses 32 and may be fixedly secured to the first base 20. In some configurations, the support brackets 34 may have generally C-shaped cross sections and may include one or more reinforcement ribs 35 (FIG. 10) or webs.

Figure 2:
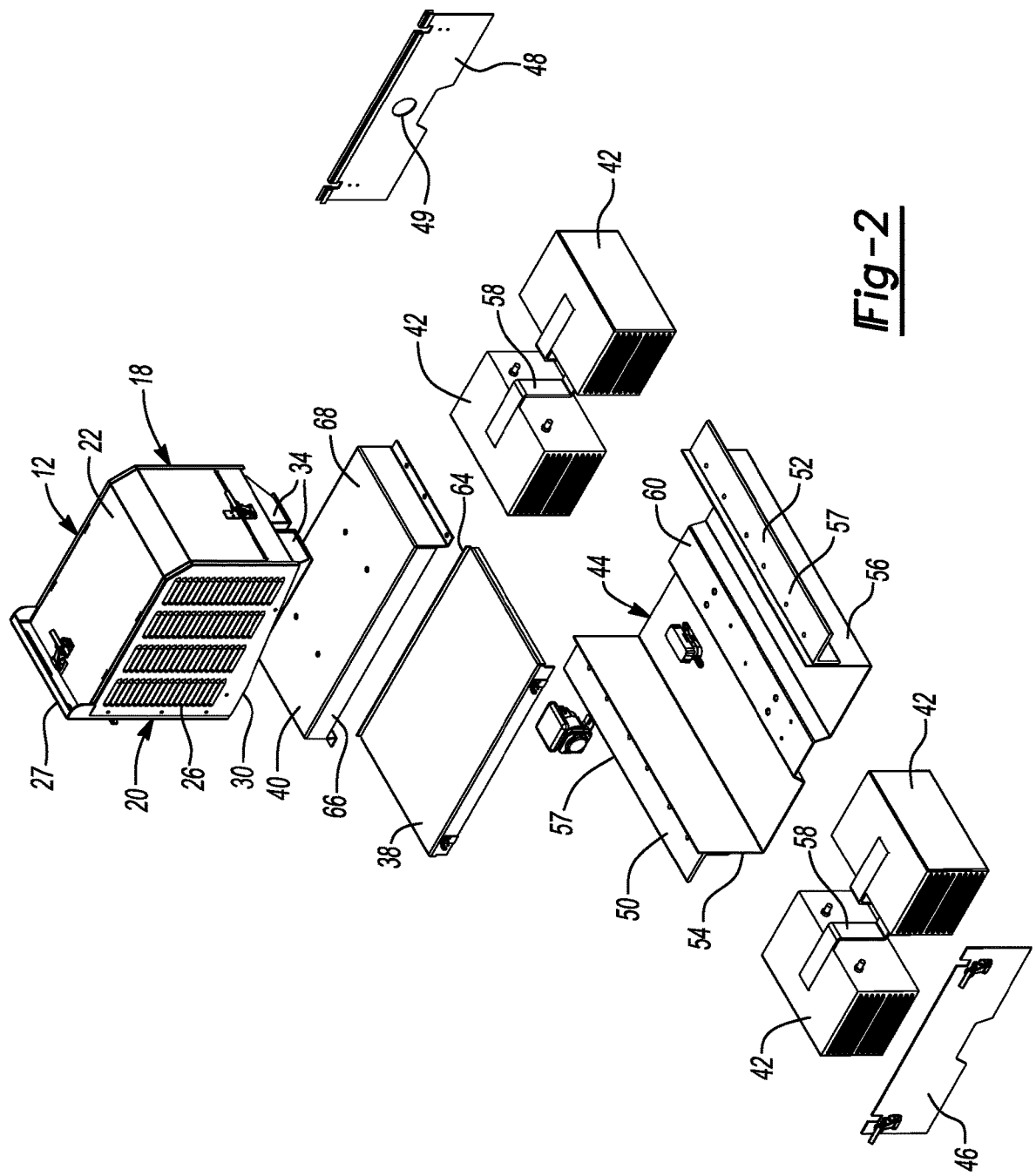
FIG. 2 is an exploded perspective view of the battery box and auxiliary power unit assembly.
Figure 3:
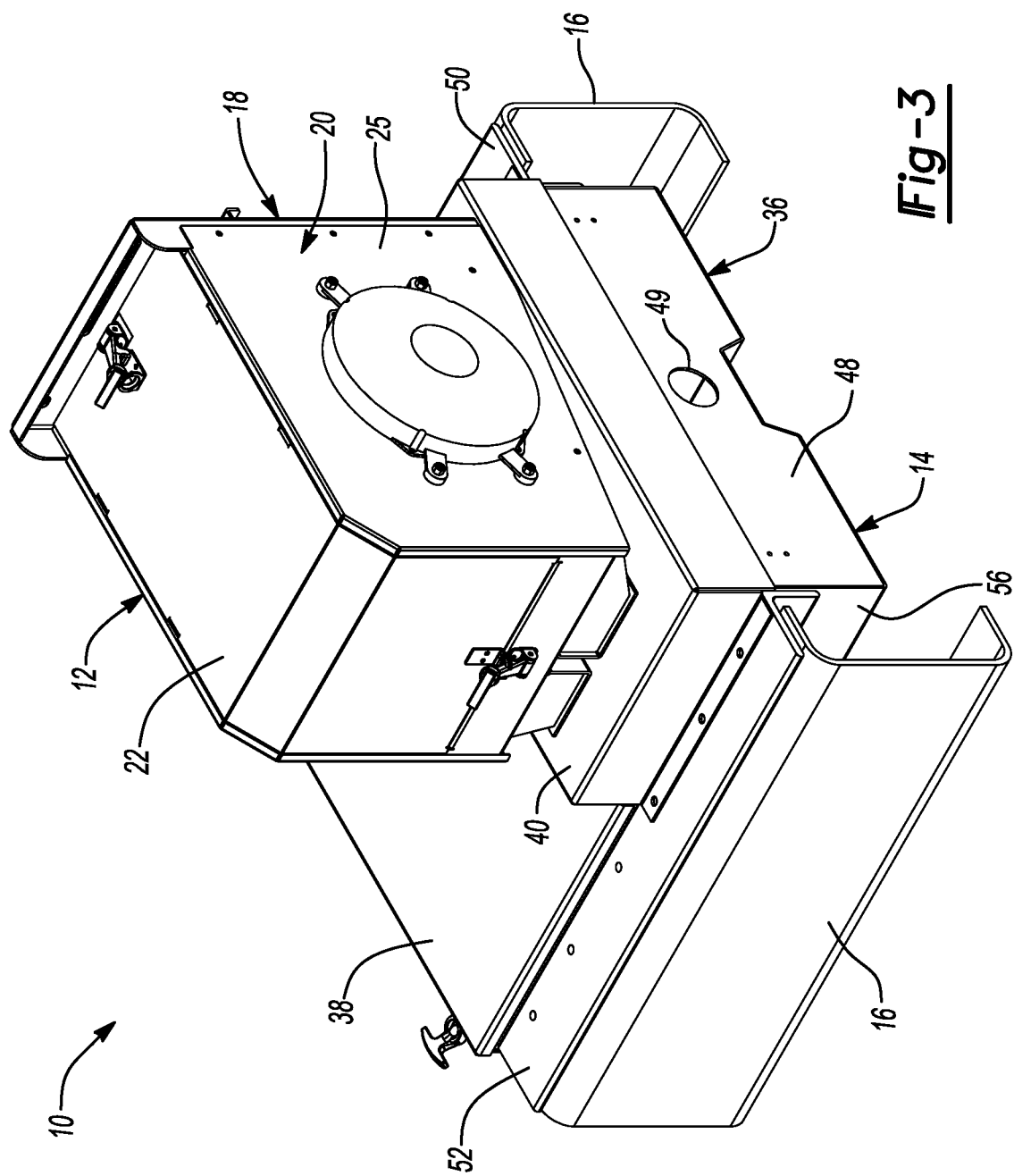
FIG. 3 is another perspective view of the battery box and auxiliary power unit assembly.
Figure 4:
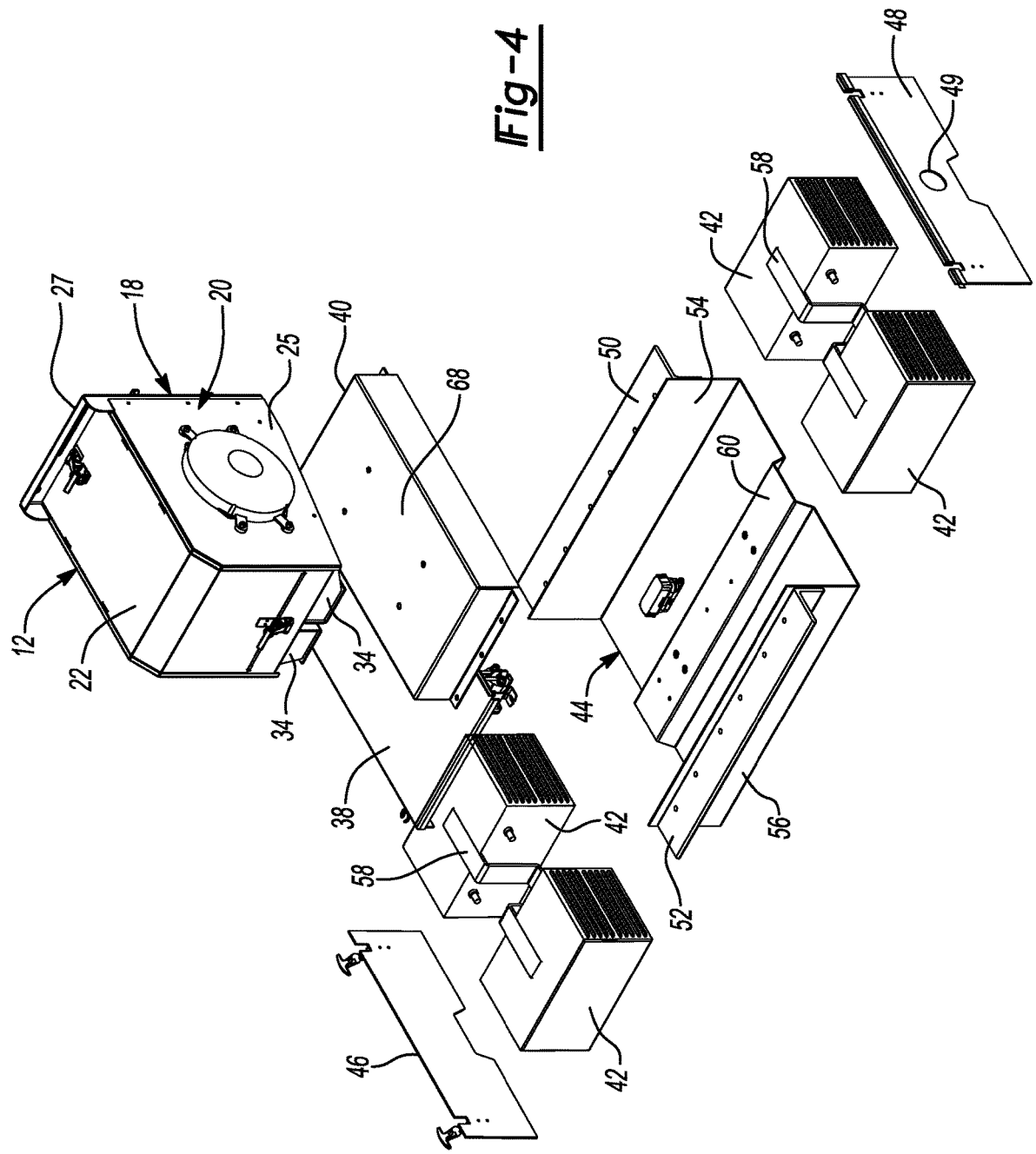
FIG. 4 is another exploded perspective view of the battery box and auxiliary power unit assembly.
Figure 5:
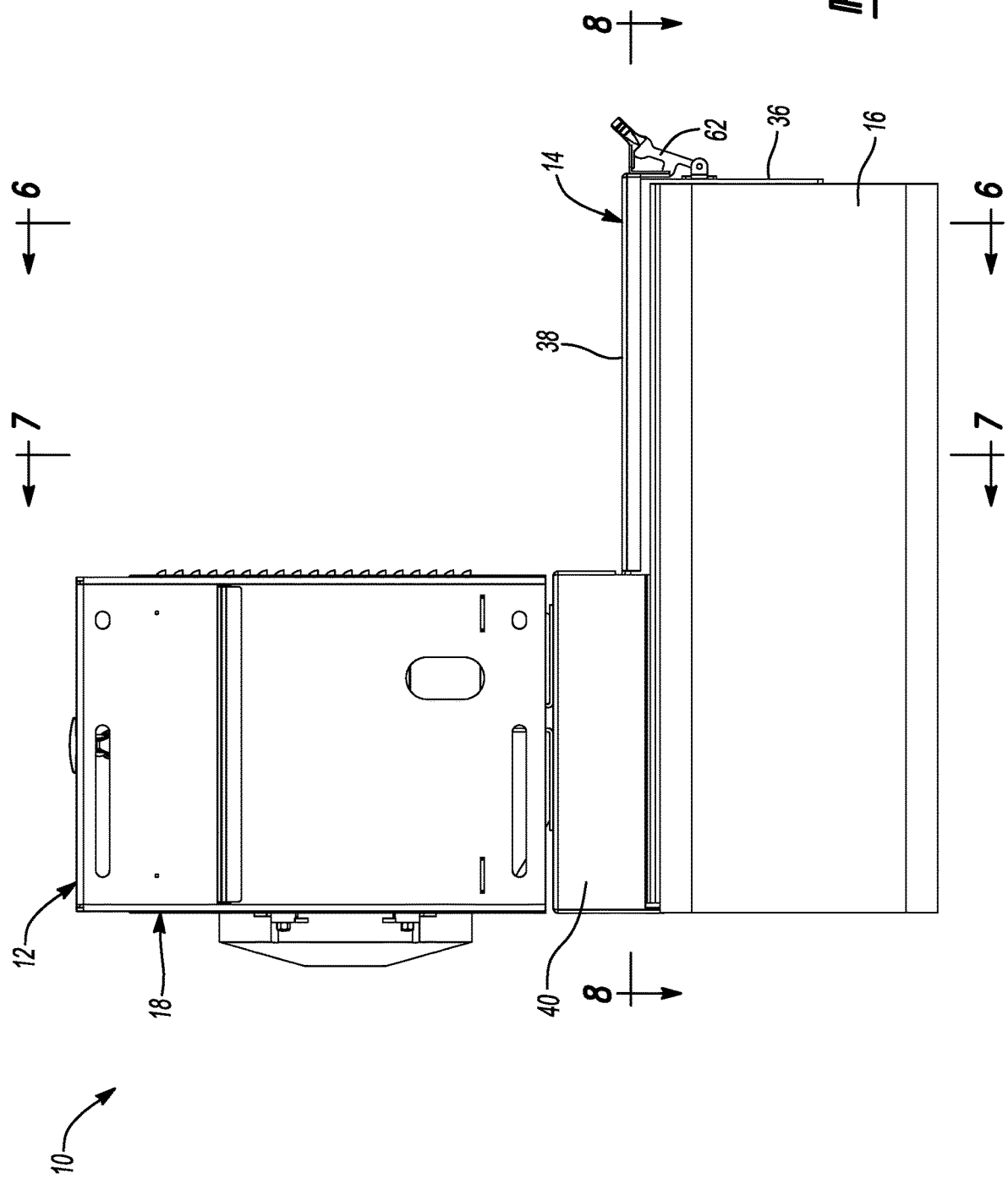
FIG. 5 is a side view of the battery box and auxiliary power unit assembly.

The battery box 14 may be formed from a metallic material, for example, and/or any other suitable material. The battery box 14 may include a second base 36, a first cover 38 and a second cover 40. The second base 36 and the first and second covers 38, 40 cooperate to define a housing for one or more batteries 42 (FIG. 2). The batteries 42 may be horizontally mounted within the battery box 14. The second base 36 may include a main body 44 and first and second end panels 46, 48. The second end panel 48 may include an aperture 49 (FIGS. 2 and 3) through which wires (not shown) may extend for connection to the batteries 42. First and second brackets (or support angles) 50, 52 may be attached to the main body 44 and may extend laterally outward from respective first and second lateral sides 54, 56 of the main body 44. The brackets 50, 52 may have L-shaped profiles. The end panels 46, 48 and the brackets 50, 52 may be welded or otherwise fixedly attached to the main body 44.

Figure 6:
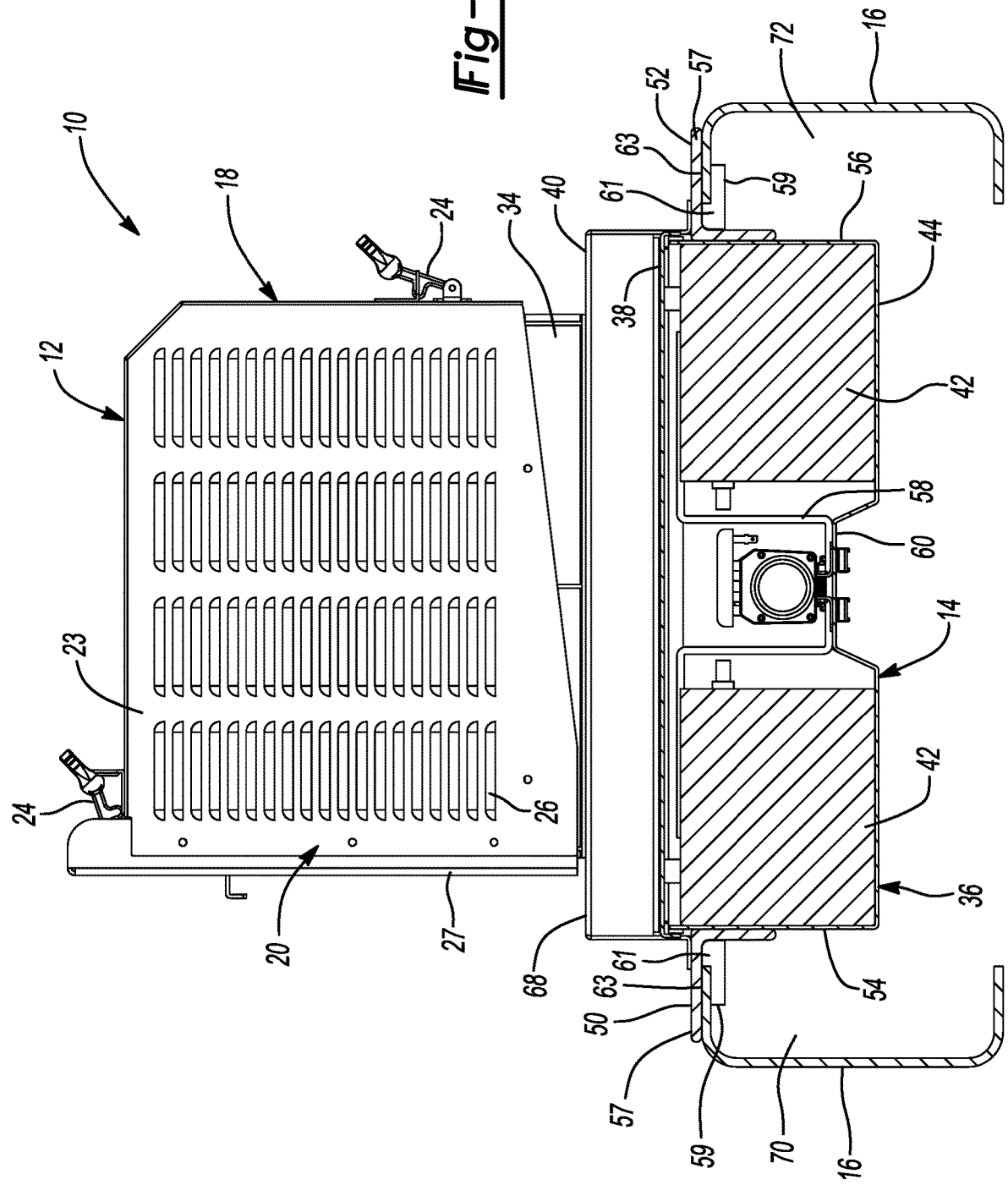
FIG. 6 is a cross-sectional view of the battery box and auxiliary power unit assembly taken along line A-A of FIG. 5.

As shown in FIG. 6, laterally outwardly extending legs 57 of the brackets 50, 52 may be attached to the rails 16 by a plurality of L-shaped clamps 59 such that the assembly 10 is supported by or suspended from surfaces 63 of the rails 16. The clamps 59 may each have a threaded post 61 that threadably engages each of the legs 57 or extends through an aperture in the legs 57 and is secured with nuts, for example. In this manner, at least a portion of the battery box 14 (e.g., some or all of the second base 36) may be received in a space between the rails 16.

As shown in FIGS. 2, 6 and 8, battery brackets 58 may couple two or more of the batteries 42 to each other. The battery brackets 58 may be attached to a ridge 60 (via threaded fasteners, for example) that is formed in the main body 44 that extends between the end panels 46, 48.

The first cover 38 may be removably attached to the second base 36 by one or more latches 62 (e.g., rubber latches). The first cover 38 may extend from the first lateral side 54 to the second lateral side 56 and from the first end panel 46 to the second cover 40. As shown in FIGS. 2 and 10, an end of the first cover 38 may include a lip 64 that engages a flange 66 of the second cover 40. The latches 62 and interference between the lip 64 and flange 66 cooperate to removably secure the first cover 38 to the second base 36 and the second cover 40.

The second cover 40 may be attached to the second base 36 (e.g., by welding, fasteners and/or other means). The second cover 40 may extend from the first lateral side 54 to the second lateral side 56 and from the first cover 38 to the second end panel 48. The support brackets 34 and APU 12 may be mounted to a surface 68 of the second cover 40. The second cover 40 may extend from the second base 36 in a direction D (FIG. 9) further than the first cover 38 extends from the second base 36 in the direction D. In this manner, the second cover 40 may be disposed between the APU 12 and the first cover 38 in the direction D. The direction D may be perpendicular to the surface 68. One or more seals may be provided to provide a sealed relationship between the second base 36 and the first cover 38, between the second base 36 and the second cover 40 and between the first and second covers 38, 40.

As shown in FIG. 6, the rails 16 may have generally C-shaped profiles such that one of the rails 16 cooperates with the first lateral side 54 of the second base 36 to define a first channel 70 therebetween and the other rail 16 cooperates with the second lateral side 56 of the second base 36 to define a second channel 72 therebetween. It will be appreciated that the rails 16 could have any cross-sectional profile.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery box and auxiliary power unit housing assembly, comprising:
   an auxiliary power unit housing;
   a battery box including a base, a first cover and a second cover, the auxiliary power unit housing being mounted to the second cover, the first cover including a lip that engages a flange of the second cover, the first cover being removably attached to the base and the second cover while the auxiliary power unit housing is mounted to the second cover; and
   a pair of brackets fixed to the battery box and extending laterally outward from lateral sides of the base.

2. The assembly of claim 1, further comprising one or more batteries disposed within the base.

3. The assembly of claim 2, further comprising a plurality of battery brackets, wherein each of the battery brackets couples two adjacent batteries to each other and is attached to the base.

4. The assembly of claim 3, wherein the battery brackets are attached to a ridge formed in the base, the ridge extending between pairs of adjacent batteries.

5. The assembly of claim 1, further comprising auxiliary power unit support brackets coupling the APU housing to the second cover.

6. The assembly of claim 5, wherein the auxiliary power unit support brackets are disposed in recesses in the auxiliary power unit housing.

7. The assembly of claim 5, wherein the auxiliary power unit housing includes a shroud at least partially surrounding one or more of the auxiliary power unit support brackets.

8. The assembly of claim 1, wherein the auxiliary power unit housing includes a removable lid.

9. The assembly of claim 8, further comprising a plurality of latches removably securing the lid to the auxiliary power unit housing.

10. The assembly of claim 1, wherein the brackets are configured to attach to truck frame rails such that at least a portion of the battery box is suspended between the truck frame rails.

11. The assembly of claim 10, wherein the first cover is adapted to be disposed between the truck frame rails.

12. The assembly of claim 1, wherein the auxiliary power unit housing is mounted to a planar surface of the second cover, and wherein the second cover extends from the base further than the first cover extends from the base in a direction that is perpendicular to the planar surface such that the second cover is disposed between the auxiliary power unit housing and the first cover in the direction.

13. The assembly of claim 1, further comprising a plurality of latches removably securing the first cover to the base.

14. The assembly of claim 1, wherein the second cover is fixedly attached to the base.

15. A battery box and auxiliary power unit housing assembly, comprising:
    an auxiliary power unit housing; and
    a battery box including a base, a first cover and a second cover defining a volume, the first cover being removably attached to the base, the second cover being attached to the base and partially overlapping the first cover, the auxiliary power unit housing being mounted to the second cover, the first cover including a lip that engages a flange of the second cover, wherein the lip is disengaged and spaced apart from the flange when the first cover is detached from the base.

16. The assembly of claim 15, further comprising a plurality of latches removably securing the first cover to the base.

17. The assembly of claim 15, further including brackets fixed to the battery box, wherein the brackets are configured to attach to truck frame rails such that at least a portion of the battery box is suspended between the truck frame rails.

18. An assembly comprising:
    an auxiliary power unit housing; and
    a battery box including a base, a first cover and a second cover, the first cover being removably attached to the base, the second cover being attached to the base, each of the first cover and the second cover at least partially covering the base to define a volume, the first cover including a lip that biasedly engages a flange of the second cover when the first cover is secured to the base.

19. The assembly of claim 18, wherein the auxiliary power unit housing is mounted to a planar surface of the second cover, and wherein the second cover extends from the base further than the first cover extends from the base in a direction that is perpendicular to the planar surface such that the second cover is disposed between the auxiliary power unit housing and the first cover in the direction.

* * * * *